United States Patent [19]

Lagares

[11] Patent Number: 4,958,410
[45] Date of Patent: Sep. 25, 1990

[54] MACHINE FOR MEAT TREATMENT AND MACERATION WITH AUTOMATIC LOADING AND UNLOADING

[75] Inventor: Narciso C. Lagares, Besalu, Spain

[73] Assignee: Metalquima, S.A., Gerona, Spain

[21] Appl. No.: 327,268

[22] Filed: Mar. 22, 1989

[51] Int. Cl.$^5$ ............................................. A22C 9/00
[52] U.S. Cl. ..................................... 17/25; 100/910; 99/472
[58] Field of Search ............... 17/25, 26, 27; 100/910; 99/472

[56] References Cited

U.S. PATENT DOCUMENTS

| | | | |
|---|---|---|---|
| 4,036,122 | 7/1977 | Langen | 17/25 |
| 4,453,288 | 6/1984 | Lobiondo et al. | 17/26 |
| 4,791,705 | 12/1988 | Corominas | 17/25 |

FOREIGN PATENT DOCUMENTS

| | | | |
|---|---|---|---|
| 127608 | 12/1984 | European Pat. Off. | 17/25 |
| 284786 | 10/1988 | European Pat. Off. | 17/25 |
| 1052235 | 3/1986 | Japan | 17/25 |
| 3007740 | 1/1988 | Japan | 17/25 |
| 1232905 | 5/1971 | United Kingdom | 17/25 |

Primary Examiner—Willis Little
Attorney, Agent, or Firm—Fleit, Jacobson, Cohn, Price, Holman & Stern

[57] ABSTRACT

Machine for meat treatment and maceration with automatic loading and unloading including a rotatable drum having an internal chamber, a loading and unloading hood inlet opening defined in one end of the internal chamber, a closing door-lid engaging against the loading and unloading hood inlet, a supporting structure on the frame independent of the drum for supporting the door-lid, a device for rotatably supporting the door-lid on the supporting structure, a device for positioning the door-lid in and separating it from the drum inlet, a drive assembly for fitting and locking the door-lid in tight closing engagement in the inlet in any position of rotation, and a device on the supporting structure assembly for releasably gripping the drive assembly so that the drive assembly is released and the door-lid is freely rotatable on the supporting structure when the door-lid is fitted and locked to the hood inlet to allow rotation of the door-lid with the drum, and the drive assembly is locked on the supporting structure during opening and closing of the hood-inlet by the door-lid for loading and unloading of the drum.

3 Claims, 2 Drawing Sheets

MACHINE FOR MEAT TREATMENT AND MACERATION WITH AUTOMATIC LOADING AND UNLOADING

BACKGROUND OF THE INVENTION

1. Field of the Invention

The present invention relates to improvements in a machine for meat treatment and maceration, with automatic loading and unloading, such as the machine described in prior U.S.A. Pat. No. 4,791,705 of same inventor, intended for allowing the tight closing door-lid of the meat treatment rotatable drum's loading and unloading hood inlet, to become independent from its support and means for positioning and separating the door with respect to the drum, with possibility of freely rotating from the moment the closing door-lid remains fitted and interlocked in the hood inlet.

2. Description of the Prior Art

The machine of the U.S.A. Pat. No. 4,791,705 includes a drum rotatable on its symmetry axis, with a loading hood inlet, opening, against which a closing door acts, the access opening in the drum being coaxial with the rotational axis, and defined in one of the ends of the internal chamber of the drum, driving and rolling elements monitoring and supporting the drum for rotation on a tiltable frame, articulated at one of its ends to a fixed support structure. The door of the meat treatment drum is assembled on a support structure independent of the drum, but connected with the tiltable frame, and has means for positioning and separating it with respect to the drum loading and unloading hood inlet, and means allowing its rotation on its center with respect to the support structure.

The door is arranged for fitting and locking in tight closing in the drum hood inlet in any position of rotation.

The need of the door-lid's locking means at the hood inlet of the drum is due to the particular treatment of the meat in this machine, which includes a series of subsequent vacuum, and pressure cycles, realized inside the drum, while it is rotating and the meat is subjected to a particular massage and/or beating so that pressure inside the drum of a significant magnitude may be sustained without the risk of opening or loss of pressure in the chamber.

The locking means of the door-lid, at the drum hood inlet, include a stem from which, at the central part of the door-lid, a series of radial blades extend, that are connected to a system of articulated levers, whose expansion by the stem axially operated in advance by the action of a linear hydraulic cylinder determines the displacement of some finger-like locking appendages, conveniently guided, whose ends are fitted in a locking position, in an annular recess defined in the drum's hood inlet inner wall.

According to the construction features shown in the U.S.A. Pat. No. 4,791,705, the door-lid that tightly closes the drum, remains all the time coupled to the support and handling structure of the door, and is formed by a support having a pivotable articulated arm to which the stem of an hydraulic cylinder is associated, to enable advance and return of the door-lid, toward and from the closing position, i.e., relative to the loading and unloading hood inlet of the drum. The rotatable arm has at its end a tubular housing that receives the referred to hydraulic cylinder which operates the locking means of the door-lid of the drum, and whose liner is also rotatable with respect to the housing, with the assistance of some proper bearings, in order to allow a free rotation of the door, with respect to the fixed support of the pivotable arm, in the closed position, when the drum is closed.

In the construction of said patent both the support bearing positioning means of the door-lid and the drum are supported on the same frame (the tiltable frame as described), producing the disadvantage of establishing a stiff positional coupling between the door-lid support structure and the drum, in the closing position of the and during meat treatment. Thus, should the loading hood inlet of the drum sustain a slight deviation from its ideal position (foreseeable for instance, by wearing out of the rolling means that support the drum on the frame), when rotating the drum, an excessive strain of the support structure would occur that would tend to deform it, shortening the assembly working life.

BRIEF SUMMARY OF THE INVENTION

In order to overcome this drawback the improvements of the invention are essentially characterized in that the supporting assembly of the driving device for locking the door-lid in the closed position in the hood inlet of the drum, is supported on the support and positioning structure by some means that allows the door to remain free and independent of the support and positioning structure, once the door-lid is fitted in the annular recess in the drum's loading hood inlet inner wall, and provides for reestablishing the coupling condition between the driving assembly and the support and positioning means of the door at the stages before the opening of the hood-inlet and during the loading and unloading of the drum. The means that couple the end of the pivotable arm and the housing that receives the hydraulic cylinder that operates the means for locking the door-lid at the hood inlet of the drum, basically consist of a jaw device associated to the end of the referred to arm, that keeps the housing coupled at all times except during the periods in which the door is fitted in the closed position at the hood inlet of the drum when the housing is released and to avoid any kind of excessive strain on the support structure.

BRIEF DESCRIPTION OF THE DRAWINGS

The invention will now be described in detail with reference to the accompanying drawings, wherein.

DETAILED DESCRIPTION

Figure 1:
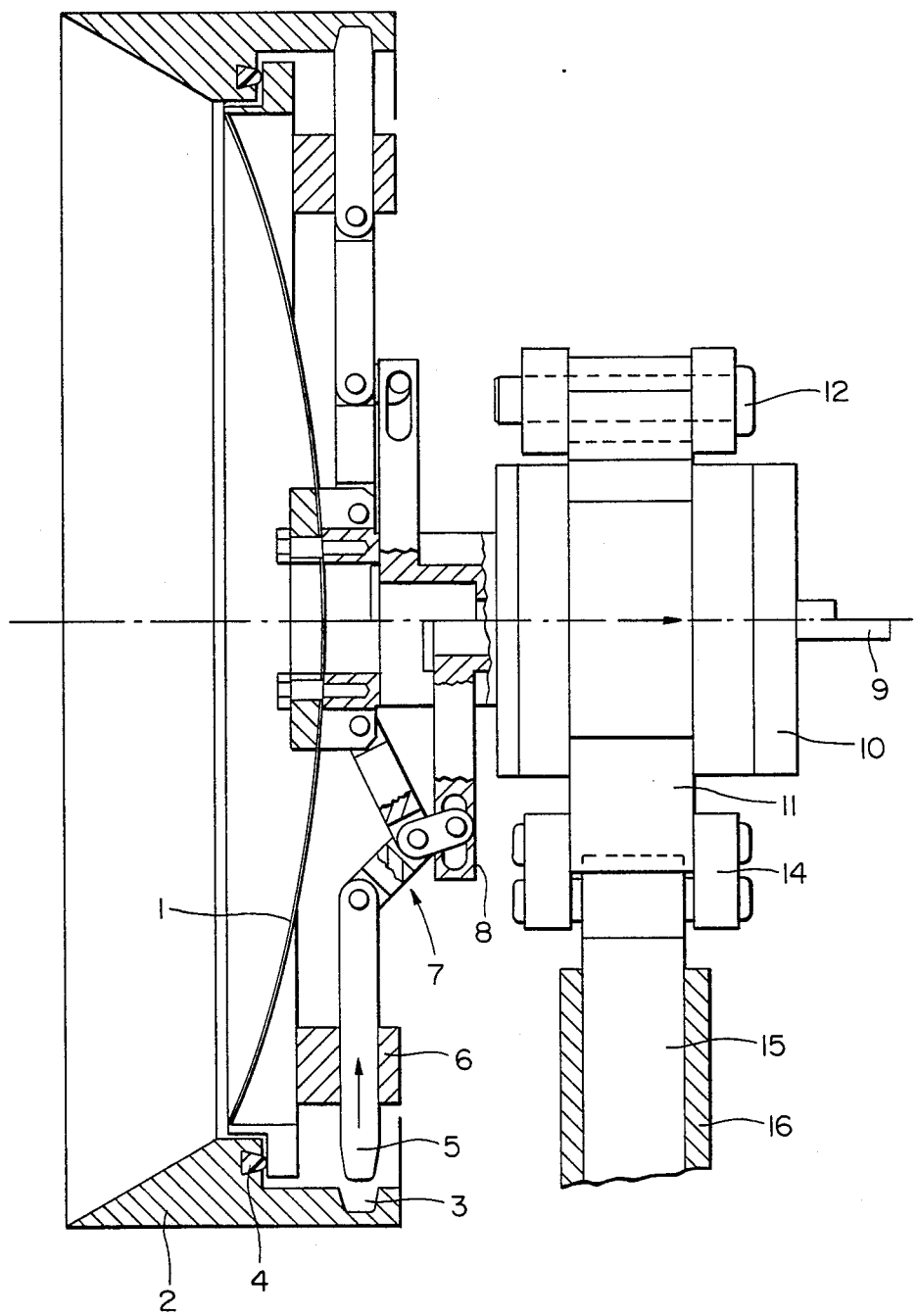
FIG. 1 is a transverse partial cross-sectional view, showing the closing door fitted to the drum hood inlet, pivoting arm of the support structure and jaw device.
Figure 2:
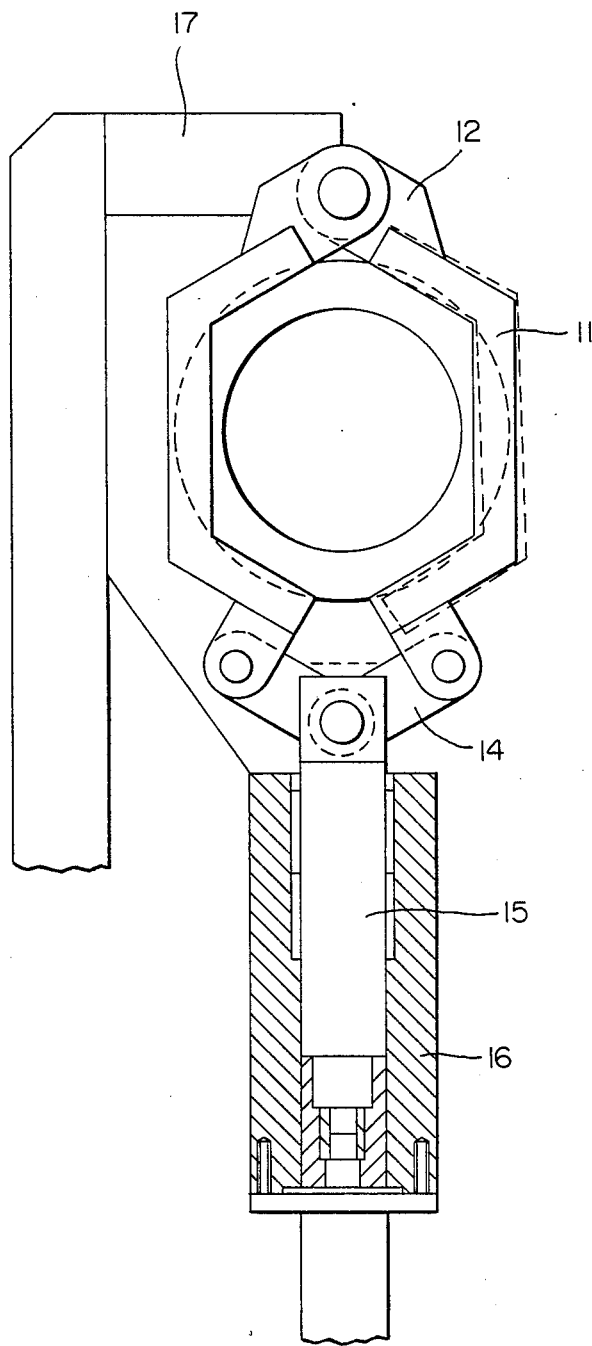
FIG. 2 a partial top plan view and partial cross-sectional view of the jaw means used to couple the support structure of FIG. 1 to the hydraulic cylinder housing, to lock the lid at the loading/unloading hood inlet of the drum.

In FIG. 1, there appears the door-lid —1—, the loading and unloading hood inlet 2— of the drum, the annular recess —3— on the entire contour of the hood inlet's internal wall with the sealing means for tight closing —4—, the radial locking appendages, —5—, conveniently driven in the guides —6— and consisting of a system of levers all of which are designated by numeral —7—, and coupled to radial blades —8— linked to the stem —9— of an hydraulic cylinder, whose liner is rotatable with respect to the housing —10— that houses it.

The means that constitutes the improvement of this invention include the jaw device —11— that embraces the housing —10— articulated at one of the ends thereof by a bolt —12— and associated at the other end to a system of levers —14— coupled to the stem —15— of a liner hydraulic cylinder —16—. The bolt —12— couples the one end of the jaw device —11— to an arm —17— pivotally mounted, operated by an hydraulic cylinder, associated with a support assembled to the supporting frame for the rotary drum to treat the meat products. The hydraulic cylinder —16—, is also coupled to arm —17—.

I claim:

1. In a machine for meat treatment and maceration with automatic loading and unloading having a frame, a drum rotatably mounted on its symmetry axis on the frame, an internal chamber in the drum, and a loading and unloading hood inlet opening defined in one end of the internal chamber, a closing door-lid engaging against said loading and unloading hood inlet, a supporting structure on the frame and independent of the drum for supporting the closing door-lid, means for rotatably supporting the closing door-lid on said supporting structure, means for positioning said closing door-lid in said drum inlet and for separating said closing door-lid therefrom, and driving assembly means for fitting and locking said door-lid in tight closing engagement in the drum hood inlet in any position of rotation, the improvement comprising:

means on said supporting structure assembly for releasably gripping said driving assembly means so that said driving assembly means is released and said door-lid is freely rotatable on said supporting structure when said door-lid is fitted and locked to said hood inlet to allow rotation of the door-lid with the drum, and said driving assembly means is locked on said supporting structure during opening and closing of said hood-inlet by said door-lid for loading and unloading of the drum.

2. The improvement as claimed in claim 1 wherein said means for releasably gripping said driving assembly means comprises:

a jaw device formed by a plurality of levers and embracing said driving assembly means;

means for pivotally connecting said jaw device at one end thereof to said supporting structure; and hydraulic cylinder and piston means mounted on said supporting structure and operatively pivotally connected to said jaw device at the other end thereof so that actuation of said cylinder and piston means in one direction opens said jaw device to allow rotation of said driving assembly means while supported by said jaw device and actuation of said cylinder and piston means in the other direction locks said jaw device onto said driving assembly means to prevent rotation thereof.

3. The improvement as claimed in claim 2 wherein:

said supporting structure comprises a pivotal arm;

the cylinder of said cylinder and piston means is mounted on said arm; and said jaw device comprises two substantially U-shaped levers each having one end thereof pivotally connected together and to said arm, two additional levers each pivotally connected at one end thereof to the other end of a respective one of said U-shaped levers and pivotally connected at the other end thereof to the piston of said cylinder and piston means.

* * * * *